Patented Oct. 28, 1941

2,261,002

UNITED STATES PATENT OFFICE 2,261,002

ORGANIC NITROGEN COMPOUNDS

David Moore Ritter, Claymont, Del., assignor to E. I. du Pont de Nemours & Company, Wilmington, Del., a corporation of Delaware No Drawing. Application June 17, 1941, Serial No. 398,496

28 Claims. (Cl. 260—570)

This invention relates to organic compounds and more particularly to quaternary ammonium compounds.

This application is a continuation-in-part of my copending application Serial No. 227,591, filed August 30, 1938.

This invention has as an object the provision of a process for the preparation of linear polymeric quaternary ammonium compounds. A further object is the provision of new organic compounds. Another object is the provision of new compounds useful as photographic chemicals, leather-treating chemicals, mold inhibitors, pesticides (e. g., bactericides), pour-point depressants, pigment dispersion control agents, surface-active agents, modifying agents for viscose, modifying agents for cellulose acetate rayon, adhesives and the like. Other objects will appear hereinafter.

These objects are accomplished by the following invention wherein a ditertiary diamine in which, for each amino nitrogen, the radical joining the amino nitrogens and the remaining radicals comprise at least two saturated radicals, is reacted with a dihalide wherein the halogen atoms have an atomic weight of at least 35, are the same or different, and are attached to aliphatic carbon atoms which have only single bonds, the amine and halide being so selected that the sum of their radical lengths, as hereinafter defined, exceeds seven. Preferably, the dihalide is a diprimary dihalide and preferably the radical joining the halogen atoms of the dihalide is different from that joining the nitrogen atoms of the amine.

By a diprimary dihalide is meant a compound in which both halogen atoms are attached to methylene groups; in such a halide it will be apparent that the carbons to which the halogens are attached are joined to other atoms only by single bonds. By the "radical length" of the ditertiary diamine is meant the length of the chain between and inclusive of the amino nitrogens. By the "radical length" of the dihalide is meant the length of the chain between but exclusive of the halogens.

In carrying out this invention, the diamine and dihalide are mixed in quantities such that the diamine-dihalide molar ratio is from 0.61:1 to 1.16:1, but preferably the ratio is 1:1 or very nearly 1:1. The reaction is carried out without solvent or in the presence of an inert solvent for the reactants, such as methanol, toluene or dioxan. The mixture is heated at about 60 to 150° C. for about 2 to about 48 hours. The product is recovered from the reaction mixture by conventional methods such as evaporation, filtration and the like. The desired polymeric quaternary salt generally requires no purification. The time of heating will vary with the degree of polymerization desired, though there is apparently little or no further polymerization after about 24 hours' time.

The chain length of the polymer may be controlled by the use of monofunctional reactants such as tertiary monoamines and alkyl halides which may be added to the reaction mixture before or during the heating. If added before or at the beginning of the heating they are added in amount ranging preferably from one to ten mole per cent of the corresponding diamine or dihalide. If added during the heating they may be added in large amount shortly before the molecular weight of the polymer in the reaction mixture reaches the desired value or be added in small amount, as above, well before the reaction mixture reaches the desired molecular weight value.

The more detailed practice of the invention is illustrated by the following examples, wherein parts given are by weight. There are of course many forms of the invention other than these specific embodiments.

Example I

Decamethylene dibromide (174.42 parts) and N,N,N',N' - tetramethylhexamethylenediamine (100.00 parts) are dissolved in 400 parts of methyl alcohol and the solution refluxed for 19 hours. At the end of that time the solution is filtered and the alcohol removed under diminished pressure. A 98% yield of a tough, light yellow, polymeric, quaternary salt is obtained. It is soluble in water and the lower aliphatic alcohols. The product softens at about 205–215° C. It had a total bromine content of 33.5% and an ionic bromine content of 32.89%. A product of the formula $(C_{20}H_{44}Br_2N_2)_n$ has a calculated bromine content of 33.90%.

Example II

N,N,N',N' - tetramethyldecamethylenediamine (10.162 parts) and decamethylene dibromide (13.371 parts) are dissolved in 180 parts of methyl alcohol and the solution heated under reflux for 24 hours. At the end of that time the solution is filtered and the alcohol removed under diminished pressure. A 98% yield of a light yellow, tough polymer is obtained. This polymeric quaternary salt is soluble in water and alcohols and forms tough films when cast from solution. This product softens at about 225–235° C.

*Example III*

N,N,N',N' - tetramethylethylenediamine (13.74 parts) and decamethylene dibromide (35.53 parts) are dissolved in 160 parts of methyl alcohol, and the solution heated under reflux for 20 hours. At the end of this time, the solution is filtered and the alcohol removed under reduced pressure. A polymeric, light-yellow material is obtained in 90% yield. It softens at about 205–215° C.

*Example IV*

N,N,N',N'-tetramethyl - p,p'-diaminodiphenylmethane (38.10 parts) and decamethylene dibromide (45.00 parts) are dissolved in 200 parts of methanol, and the solution refluxed for a period of 20 hours. At the end of this time, the solution is filtered and the alcohol removed under diminished pressure. An 85% yield of dark, sticky, polymeric product is obtained. The material softens at about 200–210° C.

*Example V*

N,N,N',N'-tetramethyl - p,p'-diaminodiphenylmethane (12.71 parts), decamethylene dibromide (15.0 parts), and trimethylamine (0.2454 part corresponding to ten mol per cent) are dissolved in methanol (320 parts) and heated on a steam bath for 24 hours. The methanol is removed under diminished pressure giving a quantitative yield of a light blue polymer having an ionic bromine content of 26.18%.

*Example VI*

N,N,N',N' - tetramethylhexamethylenediamine (10.866 parts) and ethylene dichloride (6.400 parts) are heated in a sealed vessel for 10 hours at 100° C. under an atmosphere of nitrogen. The polymeric quaternary salt obtained is a dark brown, sticky, polymeric product. It is obtained in 50% yield.

*Example VII*

N,N'-diethanolpiperazine (8.70 parts) and decamethylene dibromide (15.00 parts) in 200 parts of methanol are heated for 24 hours at 100° C. The methanol is removed under diminished pressure, giving a waxy polymer, which is freed from the last traces of solvent by rinsing with anhydrous ether and drying in a vacuum desiccator over P₂O₅. The yield is 97 per cent of theory.

*Example VIII*

N,N,N',N' - tetramethyl - p - phenylenediamine (4.55 parts) and decamethylene dibromide (8.325 parts) in 100 parts of methanol are heated for 94 hours at 100° C. The methanol is removed under diminished pressure, yielding a taffy-like product from which the last traces of methanol are removed by rinsing with anhydrous ether and drying over P₂O₅. The yield of the polymeric salt as an almost white product is 98 per cent of theory.

*Example IX*

N,N,N,'N' - tetramethylhexamethylenediamine (8.6 parts and p-xylene dibromide (13.20 parts) and methanol (160 parts) are heated on a steam bath. The resulting slurry dissolved within a few minutes and soon thereafter an insoluble polymer separates out. The mixture is heated for a total of one hour and then filtered, giving a practically quantitative yield of a white, noncrystalline polymer with an ionic bromine content of 35.76% and a total bromine content of 35.73%, the calculated value being 36.70%.

*Example X*

N,N,N',N' - tetramethylhexamethylenediamine (17.20 parts) and p-xylylene dichloride (17.49 parts) are dissolved in 320 parts of methanol and refluxed over a steam bath for 21 hours. The methanol is removed under diminshed pressure giving a practically quantitative yield of a polymeric product with an ionic chlorine content of 18.71% and a total chlorine content of 18.92%, the calculated value being 20.44%.

*Example XI*

N,N,N',N' - tetramethyldecamethylenediamine (11.40 parts) and p-xylylene dibromide (13.20 parts) in methanol (160 parts) are refluxed on a steam bath for 24 hours. The methanol is removed under reduced pressure and the residue rinsed with anhydrous ether, giving a practically quantitative yield of polymer with an ionic bromine content of 30.48% and a total bromine content of 38.05%, the calculated value being 39.22%.

*Example XII*

N,N,N',N' - tetramethylhexamethylenediamine (9.976 parts, corresponding to 0.058 mole) and hexamethylene dibromide (12.2 parts, corresponding to 0.050 mole) are dissolved in 160 parts of methanol and the solution is refluxed for 24 hours. The methanol is removed under diminished pressure, giving a quantitative yield of a white, hard, polymeric quaternary ammonium salt, having an ionic bromine content of 35.58% and a total bromine content of 36.20%, while the calculated value is 36.05%.

*Example XIII*

N,N,N',N' - tetramethylhexamethylenediamine (8.60 parts, corresponding to 0.05 mole) and hexamethylene dibromide (14.172 parts, corresponding to 0.058 mole) are dissolved in 160 parts of methanol and the solution is refluxed for 24 hours. The methanol is removed under diminished pressure, giving a quantitative yield of a white, hard, polymeric quaternary ammonium salt, having an ionic bromine content of 39.80% and a total bromine content of 40.51%, while the calculated value is 40.78%.

*Example XIV*

N,N,N',N' - tetramethylhexamethylenediamine (8.61 parts, corresponding to 0.05 mole) and hexamethylene dibromide (12.20 parts, corresponding to 0.05 mole) are dissolved in 160 parts of methanol. The solution is brought to boiling on a steam bath and to it is added trimethylamine (0.2454 part, corresponding to 0.005 mole or 10 mole per cent) in the form of a 3.64 methanol solution. After refluxing for a total of 24 hours, the methanol is removed under diminished pressure, giving a quantitative yield of a white, hard, polymeric quaternary ammonium salt, having an ionic bromine content of 34.37% and a total bromine content of 37.03%, while the calculated value is 37.10%.

*Example XV*

N,N,N',N' - tetramethylhexamethylenediamine (8.61 parts, corresponding to 0.05 mole) and hexamethylene dibromide (12.20 parts, corresponding to 0.5 mole) are dissolved in 160 parts of methanol. The solution is brought to boiling on a steam bath and to it is added methyl bromide (0.4747 part, corresponding to 0.005 mole or 10 mole per cent) as a 10% methanol solution. After refluxing for a total of 24 hours, the methanol is removed under diminished pressure, giving a quantitative yield of a hard, white, polymeric quaternary ammonium salt having an ionic bromine content of 35.57% and a total bromine content of 38.01%, while the calculated value is 39.40%.

*Example XVI*

1,6-bis(N-morpholinyl)hexane (12.81 parts) and hexamethylene dichloride (7.75 parts) are dissolved in methanol (80 parts) and heated in a sealed tube at 150° C. for 24 hours. After cooling, the methanol is removed under diminished pressure and the syrupy residue rinsed with anhydrous ether, yielding, after drying in a vacuum desiccator over $P_2O_5$, a quantitative yield of a crisp, white, hygroscopic, amorphous polymeric product with an ionic chlorine content of 16.94% and a total chlorine content of 17.88%, the calculated value being 17.24%. The product is very soluble in water and alcohol.

*Example XVII*

1,6 - bis(N - morpholinyl)hexane (12.81 parts) and hexamethylene dibromide (12.20 parts) are dissolved in methanol (80 parts) and heated in a sealed tube at 100° C. for 24 hours. The methanol is then removed under diminished pressure and the syrupy residue rinsed with anhydrous ether, yielding, after drying in a vacuum desiccator over $P_2O_5$, a light orange colored, hygroscopic, amorphous polymer with an ionic bromine content of 32.27% and a total bromine content of 32.42%, the calculated value being 31.95%. The product is very soluble in water and alcohol.

*Example XVIII*

1,10-bis(N-morpholinyl)decane (15.61 parts) and decamethylene dibromide (15.00 parts) in methanol (80 parts) are heated in a sealed tube at 100° C. for 24 hours. The methanol is removed under diminished pressure and the syrupy residue rinsed with anhydrous ether, yielding, after drying in a vacuum desiccator over $P_2O_5$, a quantitative yield of an orange colored, hygroscopic, amorphous polymer with an ionic bromine content of 29.07% and a total bromine content of 30.53%. The product is soluble in water and alcohol.

*Example XIX*

N,N,N',N' - tetramethyldecamethylenediamine (34.24 parts) and decamethylene dichloride (31.66 parts) in methanol (160 parts) are heated in a sealed tube at 150° C. for 24 hours. The methanol is removed under diminished pressure, and the resulting residue treated with anhydrous ether, giving a crisp, amorphous, hygroscopic polymer with an ionic chlorine content of 15.78% and a total chlorine content of 15.68%, the calculated value being 16.14%. It is very soluble in water and alcohol.

As already indicated the process is generically applicable to ditertiary diamines (i. e., diamines wherein both amino groups are tertiary) in which, for each amino nitrogen, the radical joining the nitrogens and the radical or radicals attached to each nitrogen comprise at least two saturated radicals. Thus, in the diamine

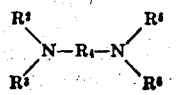

of the three radicals attached to each nitrogen, one (i. e., $R^2$, $R^3$ or $R^4$) may be unsaturated, but, if $R^4$ is unsaturated, $R^2$, $R^3$, $R^5$ and $R^6$ must be saturated. If $R^2$ is unsaturated, $R^3$ and $R^4$ must be saturated, and one only of $R^5$ and $R^6$ may be unsaturated. The aromatic ring is "unsaturated" in the above sense. Subject to the requirement just indicated as to saturation, the divalent radical joining the nitrogens may be aliphatic or aromatic, cyclic or acyclic, homocyclic or heterocyclic, saturated or unsaturated, and may be substituted or not by groups which do not interfere with the polymer-forming reaction, such as ether, sulfide, ketone, nitro, amide, hydroxyl, thiol, and the like, or interrupted by bivalent groups which do not interfere with the polymer-forming reaction such as ether, sulfide, keto (—CO—), etc. The radicals to which only one nitrogen is attached may be of the same character, or one or both nitrogens may be attached to a single divalent radical of any of the above-mentioned types, the nitrogen thereby forming a part of a heterocyclic ring. Preferably, the radicals other than that joining the nitrogens contain not more than about six carbon atoms each since extent and speed of polymer formation are favored by low molecular weight radicals. Preferably the diamine is wholly saturated since saturation favors stability of the product. Preferably, the radical between the nitrogens and all the other radicals attached to the nitrogens are hydrocarbon radicals. In general, the saturated N,N,N',N'-tetraalkylpolymethylenediamines in which each of the four alkyl groups has not more than six carbons will give best results from all points of view. Specific amines which are suitable include the following: 1,2-bis(beta-dimethylaminoethoxy)ethane, N,N,N',N'-tetraethyl - 1,4 - cyclohexylenediamine, 1,10 - bis(diethylaminomethoxy)-decane, N,N'bis - (2-hydroxyethyl)piperazine, 1,12-bis-(N-morpholinyl)dodecane, 1,8-bis-(N-piperidyl) octane, 1,6-bis-(dimethylamino)-2,5-dimethylhexane, N,N,N',N'-tetramethyl-p-phenylenediamine, N,N,N',N' - tetraethyl-1,6-diamino-3-hexene, N-allyl-N,N',N'-trimethyloctadecamethylenediamine, and triethylenediamine.

Also, as already indicated, the invention is generic to the use of any dihalide wherein both halogens have an atomic weight of at least 35, are the same or different, and are bound to singly bonded aliphatic carbon, i. e., to aliphatic carbon atoms joined to other atoms only by single bonds. By "aliphatic carbon" is meant carbon which is not a part of an aromatic ring. A much preferred group of halides is that of diprimary dihalides, i. e., of the formula

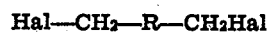

where Hal represents chlorine, bromide or iodine, and R a bivalent organic radical which preferably is hydrocarbon and in particular alkylene. The process is thus, for example, applicable to the following halides: 1,2-bis(beta-chloroethoxy)ethane; 2,5-dibromadipic acid; gamma,gamma'-dichlorodipropyl ether; beta,beta'-dichlorodiethyl ether, methylene dibromide, 1,3-dichloropropane, isobutylene dibromide, trimethylethylene dibromide, 1,4-dibromopentane, p-xylylene dibromide, 1,4-cyclohexylene dichloride, methylene diiodide, 1-bromo-10-chlorodecane, octamethylene diiodide, 2,6-dibromoheptane, tetramethylene dichloride, 2,3-dibromobutane, 1-chloro-2-bromoethane, 1-chloro-3-bromopropane, 1-chloro-4-iodobutane, 1-bromo-6-iodohexane, 1-chloro-2-bromopropane, 1-bromo-2-iodocyclohexane, 4-chloromethylbenzyl bromide, and dodecamethylene dibromide. Iodides are more reactive than bromides, and the latter are more reactive than chlorides. The radical between the

groups may be aliphatic or aromatic, cyclic or acyclic, straight or branched chain, saturated or unsaturated, and substituted or not by groups that do not interfere with the polymer-forming reaction, such as ether, hydroxyl, keto, nitro, thiol, sulfide, carboxyl, ester, and the like. The amine and halide should be so chosen that the sum of their radical lengths exceeds 7, as otherwise, ring instead of polymer formation will take place. Thus, not all the halides in the above list will combine with all of the amines previously mentioned to give polymers but only those the sum of whose radical lengths exceeds seven.

Of special importance are the polymeric quaternary ammonium salts formed from ditertiary diamines and paraxylylene dihalides, and the polymeric quaternary ammonium salts from N,N,N',N'-tetraalkyl p,p'-diaminodiphenylmethane and the above-described dihalides.

The condensation of the diamine and dihalide may, but need not, be carried out in solution in any inert organic liquid which is a solvent for the reactants and a solvent or non-solvent for the product, e. g., methanol, ethanol, benzyl alcohol, propanol, isopropanol, butanol, dioxan, acetone, and aqueous methanol or ethanol. Preferably, a solvent for the polymer is used. A diluent is not, however, absolutely necessary as polymeric quaternary salts of substantially the same properties are obtained by heating the ingredients alone at temperatures such that the polymer as it forms is kept in at least a semi-molten state.

The temperature employed with solvents may range from that at which reaction begins to be detectable, usually as low as 20-25° C., up to the decomposition temperature of the reactants, closed systems of course being required if the solvent or reactants boil below the temperature used. Preferably, however, the temperature will be on the order of 50 to 100° C. As already indicated, the times of reaction will depend on the type of polymer desired, and will usually be from 12 to 24 hours. No catalyst is needed.

The new products of the present invention may be generically described as linear polymeric quaternary ammonium salts having recurring units of the formula

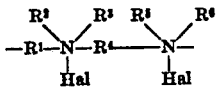

wherein Hal is chlorine, bromine, or iodine; $R^1$, the dihalide residue, is a radical in which the atoms adjacent to nitrogen are attached to other atoms only by single bonds; $R^2$, $R^3$ and $R^4$ are radicals so selected that not more than one of them is unsaturated; $R^5$ and $R^6$ are saturated except that one may be unsaturated when $R^4$ is saturated; and $R^1$ and $R^4$ are different radicals, the sum of whose chain lengths exceeds 5. $R^4$ is the bridging or joining bivalent radical of the diamine, and $R^1$ is the bridging or joining radical of the dihalide.

The products of the present invention may be used as photographic chemicals, leather-treating chemicals, mold inhibitors, pesticides (e. g., bactericides), pour-point depressants, pigment dispersion control agents, surface-active agents, modifying agents for viscose, modifying agents for cellulose acetate rayon, and adhesives. The polymeric compounds of this invention are useful for improving the properties of animal skins since they impart to them certain of the properties of tanned leather. They are also useful for fixing vegetable, polymeric polycarboxylic acid and other tannages on leather. They can also be used to fix dyestuffs on textile materials. The products may also be converted to the corresponding hydroxide compounds by removal of the halogen with silver oxide, and these resulting compounds may be reacted with organic acids such as lauric acid.

The above description and examples are intended to be illustrative only. Any modification of or variation therefrom which conforms to the spirit of the invention is intended to be included within the scope of the claims.

What is claimed is:

1. Process which comprises reacting in a ratio of from 0.61 to 1.16 mols diamine per mol of dihalide a dihalide wherein the halogen atoms have an atomic weight of at least 35 and are attached to singly bonded aliphatic carbon, with a ditertiary diamine in which, for each amino nitrogen, the radical joining the amino nitrogens and the remaining radicals are attached to the amino nitrogens through carbon and comprise at least two saturated radicals, the amine and halide being so selected that the sum of their radical lengths exceeds seven.

2. Process which comprises reacting a dihalide wherein the halogen atoms have an atomic weight of at least 35 and are attached to singly bonded aliphatic carbon with a ditertiary diamine in which, for each amino nitrogen, the radical joining the amino nitrogens and the remaining radicals are organic, are attached to the amino nitrogens through carbon, are devoid of groups interfering with polymer formation and comprise at least two saturated radicals, the amine and halide being so selected that the sum of their radical lengths exceeds seven and being reacted in a ratio of from 0.61 to 1.16 mols diamine per mol of dihalide.

3. Process according to claim 1 in which the halide is a diprimary dihalide, i. e., one in which both halogen atoms are attached to methylene groups.

4. Process according to claim 1 in which the radicals between the amine groups of the diamine and the halogen groups of the dihalide are different.

5. Process according to claim 1 wherein the ditertiary diamine is saturated and the radicals attached to the amino nitrogens other than the bridging or joining radical contain each not more than six carbon atoms.

6. A linear polymeric quaternary ammonium salt having recurring structural units of the formula

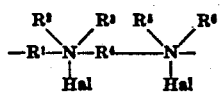

wherein Hal is a halogen of atomic weight at least 35; $R^1$ is an organic radical in which the atoms adjacent to nitrogen are carbon and are attached to other atoms only by single bonds; $R^2$, $R^3$ and $R^4$ are organic radicals attached to the nitrogen by carbon atoms and so selected that not more than one of them is unsaturated; $R^5$ and $R^6$ are organic radicals attached to the nitrogen by carbon atoms and one of which may be unsaturated when $R^4$ is saturated; and $R^1$ and $R^4$ are different organic radicals attached to the nitrogen by carbon atoms and the sum of whose chain lengths exceeds five.

7. Products of claim 6 wherein $R^2$, $R^3$, $R^4$, $R^5$ and $R^6$ are each saturated, and $R^2$ and $R^3$ each contains not more than six carbon atoms.

8. Process which comprises reacting in a ratio of from 0.61 to 1.16 mols diamine per mol of dihalide a dibromide wherein the radical joining the bromine atoms is a hydrocarbon radical and the bromines are attached to singly bonded aliphatic carbon, with a ditertiary diamine in which, for each amino nitrogen, the radical joining the amino nitrogens and the remaining radicals are hydrocarbon and comprise at least two saturated radicals, the amine and dibromide being so selected that the sum of their radical lengths exceeds seven, and the radicals between the amine groups of the diamine and the bromine atoms of the dibromide are different.

9. Process which comprises reacting in a ratio from 0.61 to 1.16 mols diamine per mole of dihalide a dibromide wherein the radical joining the bromine atoms is an aliphatic hydrocarbon radical and the bromine atoms are attached to singly bonded carbon with a ditertiary diamine in which for each amino nitrogen the radical joining the amino nitrogens and the remaining radicals are aliphatic hydrocarbon radicals and comprise at least two saturated radicals, the amine and dibromide being so selected that the sum of their radical lengths exceeds seven, and that the radicals between the amine groups of the diamine and the bromine atoms of the dibromide are different.

10. Process which comprises reacting in a ratio of from 0.61 to 1.16 mols diamine per mol of dihalide an aliphatic saturated dibromide with an aliphatic saturated ditertiary diamine wherein the radical joining the amino nitrogens of the amine and the radical joining the bromine atoms of the dibromide are hydrocarbon, are different, and so selected that the sum of their radical lengths exceeds seven.

11. Process which comprises reacting in a ratio from 0.61 to 1.16 mols diamine per mol of dihalide a polymethylene dibromide with an N,N,N',N' - tetraalkylpolymethylenediamine, the amine and dibromide being so selected that the sum of their radical lengths exceeds seven and the radicals between the amino groups of the diamine and the bromine atoms of the dibromide are different.

12. Process as in claim 10 wherein the alkyl groups attached to the amino nitrogen have each not more than six carbon atoms.

13. A linear polymeric quaternary ammonium salt having recurring structural units of the formula

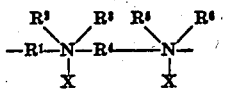

wherein X represents halogen of atomic weight of at least 35; $R^1$ is a hydrocarbon radical in which the atoms adjacent to the nitrogen are singly bonded carbon atoms; $R^2$, $R^3$, $R^4$ are hydrocarbon radicals so selected that not more than one of them is unsaturated; $R^5$ and $R^6$ are hydrocarbon radicals, not more than one of which is unsaturated when $R^4$ is saturated, and $R^1$ and $R^4$ are different radicals, the sum of whose chain lengths exceeds five.

14. A linear polymeric quaternary ammonium salt having recurring structural units of the formula

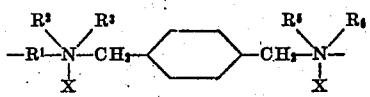

wherein X represents halogen of atomic weight of at least 35, $R^1$ is a hydrocarbon radical in which the atoms adjacent to the nitrogen are singly bonded carbon atoms; $R^2$, $R^3$, $R^5$, and $R^6$ are saturated hydrocarbon radicals and $R^1$ is different from the

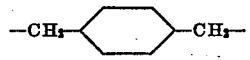

radical.

15. A linear polymeric quaternary ammonium salt having recurring structural units of the formula

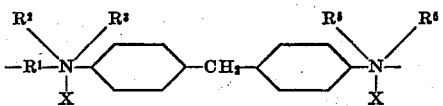

wherein X represents halogen of atomic weight of at least 35, $R^1$ is a hydrocarbon radical in which the atoms adjacent to the nitrogen are singly bonded carbon atoms; $R^2$, $R^3$, $R^5$, and $R^6$ are saturated hydrocarbon radicals and $R^1$ is different from the

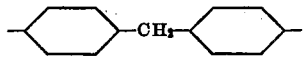

radical.

16. Compound of claim 13 wherein the halogen is bromine.

17. A linear polymeric quaternary ammonium salt having recurring structural units of the formula

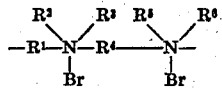

wherein $R^1$ is an aliphatic hydrocarbon radical in which the atoms adjacent to the nitrogen are singly bonded carbon atoms; $R^2$, $R^3$, $R^4$ are aliphatic hydrocarbon radicals so selected that not more than one of them is unsaturated; $R^5$ and $R^6$ are aliphatic hydrocarbon radicals, not more than one of which is unsaturated when $R^4$ is saturated, and $R^1$ and $R^4$ are different radicals, the sum of whose chain lengths exceeds five.

18. A linear polymeric quaternary ammonium salt having recurring structrual units of the formula

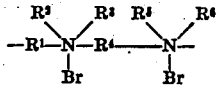

wherein $R^2$, $R^3$, $R^5$, and $R^6$ are saturated aliphatic hydrocarbon radicals and $R^1$ and $R^4$ are different saturated aliphatic hydrocarbon radicals so selected that the sum of their chain lengths exceeds five.

19. A linear polymeric quaternary ammonium salt having recurring structural units of the formula

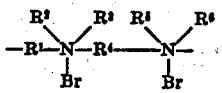

wherein $R^2$, $R^3$, $R^5$, and $R^6$ are alkyl radicals of not more than six carbon atoms, and $R^1$ and $R^4$ are different polymethylene radicals, the sum of whose chain lengths exceeds five.

20. A linear polymeric quaternary ammonium salt having recurring structural units of the formula

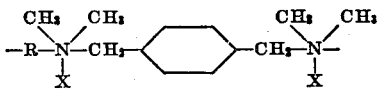

wherein X is a halogen atom of atomic weight of at least 35, and R is a divalent saturated aliphatic hydrocarbon radical.

21. A linear polymeric quaternary ammonium salt having recurring structural units of the formula

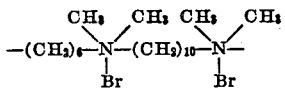

22. A linear polymeric quaternary ammonium salt having recurring structural units of the formula

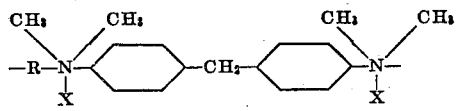

wherein X is a halogen atom of atomic weight of at least 35, and R is a divalent saturated aliphatic hydrocarbon radical.

23. A linear polymeric quaternary ammonium salt having recurring structural units of the formula

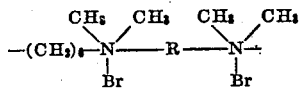

wherein R is a divalent hydrocarbon radical different from the hexamethylene radical.

24. A linear polymeric quaternary ammonium salt having recurring structural units of the formula

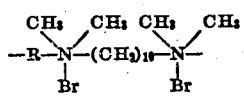

wherein R is a divalent radical different from the decamethylene radical and attached to other atoms only by single bonds.

25. A linear polymeric quaternary ammonium salt having recurring structural units of the formula

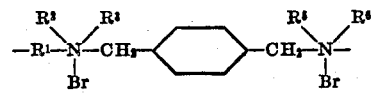

wherein $R^1$ is an organic radical in which the atoms adjacent to the nitrogen are carbon and are attached to other atoms only by single bonds; $R^2$ and $R^3$ are monovalent hydrocarbon radicals so selected that not more than one of them is unsaturated; $R^5$ and $R^6$ are monovalent hydrocarbon radicals, not more than one of which is unsaturated and $R^1$ is different from the p-xylylene radical.

26. A linear polymeric quaternary ammonium salt having recurring structural units of the formula

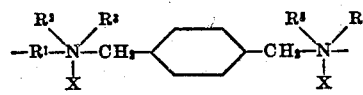

wherein X represents halogen of atomic weight of at least 35; $R^1$ is a divalent radical in which the carbons adjacent to nitrogen are attached to other atoms only by single bonds; $R^2$ and $R^3$ are monovalent hydrocarbon radicals so selected that not more than one of them is unsaturated; $R^5$ and $R^6$ are monovalent hydrocarbon radicals, not more than one of which is unsaturated and $R^1$ is different from the p-xylylene radical.

27. A linear polymeric quaternary ammonium salt having recurring structural units of the formula

28. A linear polymeric quaternary ammonium salt having recurring structural units of the formula

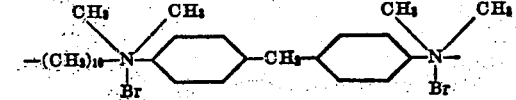

DAVID MOORE RITTER.

CERTIFICATE OF CORRECTION.

Patent No. 2,261,002.　　　　　　　　　　　October 28, 1941.

DAVID MOORE RITTER.

It is hereby certified that error appears in the printed specification of the above numbered patent requiring correction as follows: Page 2, first column, line 67, for "(8.6 parts and" read --(8.6 parts) and--; and second column, line 9, for "diminshed" read --diminished--; page 5, first column, lines 26 and 50, claims 9 and 11 respectively, after "ratio" insert --of--; and second column, line 57, claim 18, for "structrual" read --structural--; and that the said Letters Patent should be read with this correction therein that the same may conform to the record of the case in the Patent Office.

Signed and sealed this 23rd day of December, A. D. 1941.

(Seal)

Henry Van Arsdale,
　　　　　　　　　　　　　　Acting Commissioner of Patents.